US012641004B2

(12) United States Patent
  Gandhi

(10) Patent No.:  US 12,641,004 B2
(45) Date of Patent:      May 26, 2026

(54) EXTENSIONS TO SIMPLE TWO-WAY ACTIVE MEASUREMENT PROTOCOL PACKETS

(71) Applicant: Cisco Technology, Inc., San Jose, CA (US)

(72) Inventor: Rakesh Gandhi, Stittsville (CA)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 18/744,139

(22) Filed: Jun. 14, 2024

(65) Prior Publication Data

US 2025/0385856 A1      Dec. 18, 2025

(51) Int. Cl.
  *H04L 43/50*        (2022.01)
  *H04L 43/062*        (2022.01)
(52) U.S. Cl.
  CPC ............ *H04L 43/50* (2013.01); *H04L 43/062* (2013.01)
(58) Field of Classification Search
  CPC .............................. H04L 43/50; H04L 43/062
  See application file for complete search history.

(56) References Cited

U.S. PATENT DOCUMENTS

| | | | |
|---|---|---|---|
| 2023/0021278 A1 | 1/2023 | Filsfils et al. | |
| 2023/0102193 A1* | 3/2023 | Zhou ....................... | H04L 41/34 |
| | | | 370/241.1 |
| 2023/0269151 A1 | 8/2023 | Wang et al. | |

| | | | |
|---|---|---|---|
| 2023/0344752 A1 | 10/2023 | Wang et al. | |
| 2024/0022467 A1 | 1/2024 | Schmutzer et al. | |
| 2024/0195725 A1* | 6/2024 | Rajamanickam ....... | H04L 45/20 |
| 2024/0205131 A1* | 6/2024 | Rajamanickam ....... | H04L 45/26 |
| 2025/0126061 A1* | 4/2025 | Mizrahi ................. | H04L 69/325 |
| 2025/0150376 A1* | 5/2025 | Camarillo Garvia ....................... | |
| | | | H04L 41/082 |

FOREIGN PATENT DOCUMENTS

| | | | | |
|---|---|---|---|---|
| CN | 112714036 A | 4/2021 | | |
| WO | WO-2023247048 A1 * | 12/2023 | ........... | H04L 69/327 |
| WO | WO-2024246590 A1 * | 12/2024 | ............. | H04L 43/55 |

OTHER PUBLICATIONS

Bhandari S., et al., "In-situ OAM IPv6 Options", Internet Engineering Task Force, May 7, 2023, 14 Pages.

(Continued)

*Primary Examiner* — Philip C Lee
(74) *Attorney, Agent, or Firm* — Merchant & Gould P.C.; Kenneth J. Heywood

(57)        ABSTRACT

In one implementation, a device may obtain a Simple Two-way Active Measurement Protocol test packet that includes hop-by-hop data collected by the Simple Two-way Active Measurement Protocol test packet along its path. The device may determine whether the Simple Two-way Active Measurement Protocol test packet includes an instruction to reflect the hop-by-hop data back to an originating session sender. The device may copy, based on a determination that the Simple Two-way Active Measurement Protocol test packet includes the instruction, the hop-by-hop data into a type-length-value segment of a reply Simple Two-way Active Measurement Protocol test packet. The device may transmit the reply Simple Two-way Active Measurement Protocol test packet back to the originating session sender.

20 Claims, 9 Drawing Sheets

(56) References Cited

OTHER PUBLICATIONS

Brockners F., et al., "RFC 9197 Data Fields for In Situ Operations, Administration, and Maintenance (IOAM)", Internet Engineering Task Force, May 2022, Retrieved from https://www.rfc-editor.org/rfc/rfc9197.pdf, pp. 1-40.

Deering S., et al., "Internet Protocol, Version 6 (IPv6) Specification," RFC 8200, Jul. 2017, The Internet Society, Reston, VA, USA, 42 pages.

Elkins N., et al., "IPv6 Performance and Diagnostic Metrics (PDM) Destination Option", Internet Engineering Task Force, Sep. 2017, pp. 1-30.

Email, "IPPM Adoption Call for Draft-gandhi-ippm-stamp-ext-hdr", Recently Conversed Date May 16, 2024, pp. 1-3.

Email, "IPPM Adoption Call for Draft-mirsky-ippm-asymmetrical-pkts", Recently Conversed Date May 16, 2024, pp. 1-2.

Filsfils C., et al., "Path Tracing in SRv6 Networks", Internet Engineering Task Force, Aug. 9, 2023, Retrieved from https://www.ietf.org/archive/id/draft-filsfils-spring-path-tracing-04.html, 17 Pages.

Fioccola G., et al., "RFC 9343 IPV6 Application of the Alternate-Marking Method", Internet Engineering Task Force, Dec. 2022, Retrieved from https://www.rfc-editor.org/rfc/rfc9343.pdf, 16 Pages.

Gandhi R., et al., "Simple Two-Way Active Measurement Protocol (STAMP) Extensions for Reflecting STAMP Packet Headers", Internet Engineering Task Force, Feb. 6, 2024, Retrieved from https://www.ietf.org/archive/id/draft-gandhi-ippm-stamp-ext-hdr-00.html, 13 Pages.

Gandhi R., et al., "MPLS Network Action for Transporting In Situ OAM Data Fields", Internet Engineering Task Force, Mar. 17, 2024, 13 Pages.

Gandhi R., et al., "RFC 9503 Simple Two-Way Active Measurement Protocol (STAMP) Extensions for Segment Routing Networks", Internet Engineering Task Force, Oct. 2023, Retrieved from https://www.rfc-editor.org/rfc/rfc9503.pdf, pp. 1-16.

Gandhi R., "Extending Simple TWAMP (Stamp) for Carrying In Situ OAM Data Fields", Internet Engineering Task Force, Aug. 15, 2023, pp. 1-11.

Gandhi R., "Simple TWAMP (Stamp) Extensions for Hop-By-Hop and Edge-To-Edge Measurements", Internet Engineering Task Force, Aug. 16, 2023, Retrieved from https://www.ietf.org/archive/id/draft-gandhi-ippm-stamp-ioam-00.html, 10 Pages.

Hinden R., et al., "RFC 9268 IPV6 Minimum Path MTU Hop-by-Hop Option", Internet Engineering Task Force, Aug. 2022, Retrieved from https://www.rfc-editor.org/rfc/rfc9268.pdf, pp. 1-20.

Mirsky G., et al., "Performance Measurement with Asymmetrical Packets in Stamp", Internet Engineering Task Force, Feb. 20, 2024, Retrieved from https://www.ietf.org/archive/id/draft-mirsky-ippm-asymmetrical-pkts-04.html, 10 Pages.

Mirsky G., et al., "RFC 8762 Simple Two-Way Active Measurement Protocol", Internet Engineering Task Force (IETF), Mar. 2020, Retrieved from https://www.rfc-editor.org/rfc/rfc8762.pdf, ISSN: 2070-1721, pp. 1-15.

Mirsky G., et al., "RFC 8972 Simple Two-Way Active Measurement Protocol Optional Extensions", Internet Engineering Task Force (IETF), Jan. 2021, Retrieved from https://www.rfc-editor.org/rfc/rfc8972.pdf, pp. 1-29.

Mizrahi T., et al., "Internet Control Message Protocol (ICMPv6) Loopback draft-mcb-intarea-icmpv6-loopback", Internet Engineering Task Force, Jul. 2023, 6 Pages.

Mizrahi T., et al., "Internet Control Message Protocol (ICMPv6) Loopback draft-mcb-intarea-icmpv6-loopback-00", Internet Engineering Task Force, Jun. 6, 2023, 19 Pages.

Rajamanickam J., et al., "MPLS Network Action (MNA) Sub-Stack Solution", Internet Engineering Task Force, Dec. 7, 2024, 25 Pages.

Rajamanickam J., et al., "Post-Stack MPLS Network Action (MNA) Solution", Internet Engineering Task Force, Oct. 20, 2023, Retrieved from https://www.ietf.org/archive/id/draft-jags-mpls-ps-mna-hdr-01.html, 16 Pages.

Song H., et al., "RFC 9326 In Situ Operations, Administration, and Maintenance (IOAM) Direct Exporting", Internet Engineering Task Force, Nov. 2022, Retrieved from https://www.rfc-editor.org/rfc/rfc9326.pdf, pp. 1-13.

Zhou T., et al., "Simple Two-way Activity Measurement Protocol Extensions for Hop-by-Hop OAM Data Collection", Internet Engineering Task Force, Jul. 7, 2023, 17 Pages.

* cited by examiner

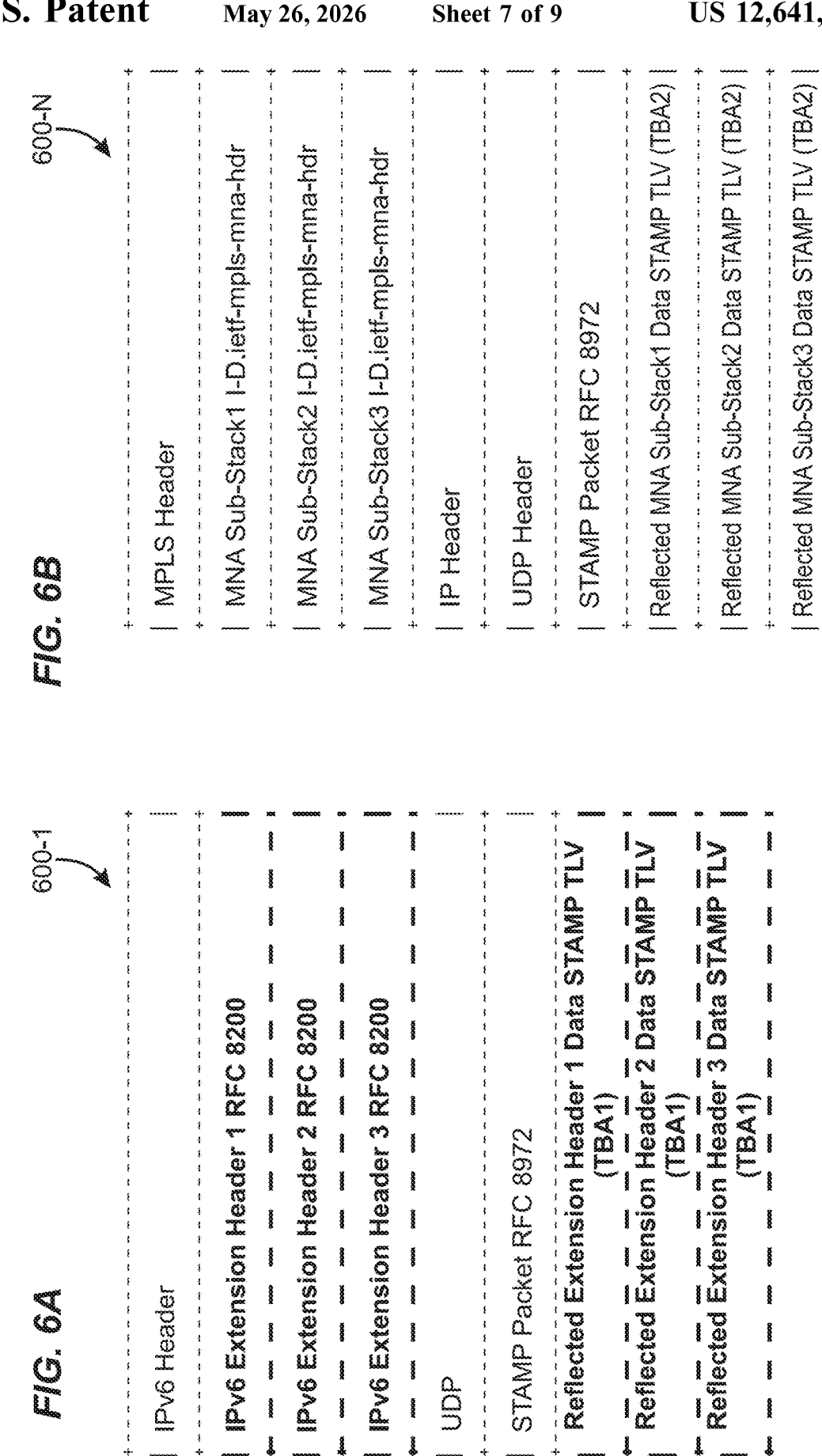

| IPv6 Header |
| IPv6 Extension Header 1 RFC 8200 |
| IPv6 Extension Header 2 RFC 8200 |
| IPv6 Extension Header 3 RFC 8200 |
| UDP |
| STAMP Packet RFC 8972 |
| Reflected Extension Header 1 Data STAMP TLV (TBA1) |
| Reflected Extension Header 2 Data STAMP TLV (TBA1) |
| Reflected Extension Header 3 Data STAMP TLV (TBA1) |

| MPLS Header |
| MNA Sub-Stack1 I-D.ietf-mpls-mna-hdr |
| MNA Sub-Stack2 I-D.ietf-mpls-mna-hdr |
| MNA Sub-Stack3 I-D.ietf-mpls-mna-hdr |
| IP Header |
| UDP Header |
| STAMP Packet RFC 8972 |
| Reflected MNA Sub-Stack1 Data STAMP TLV (TBA2) |
| Reflected MNA Sub-Stack2 Data STAMP TLV (TBA2) |
| Reflected MNA Sub-Stack3 Data STAMP TLV (TBA2) |

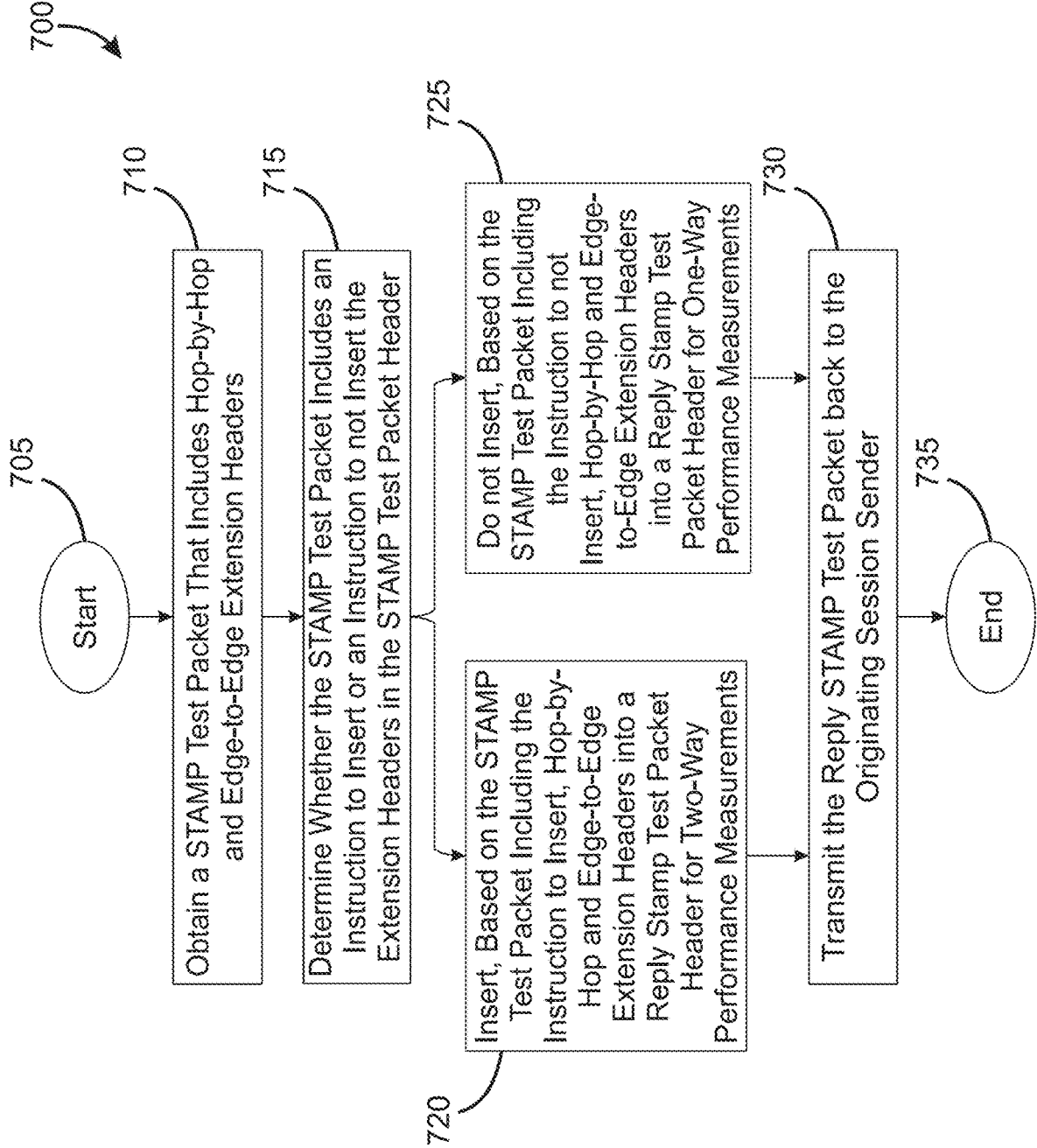

705 Start

710 Obtain a STAMP Test Packet That Includes Hop-by-Hop and Edge-to-Edge Extension Headers 715 Determine Whether the STAMP Test Packet Includes an Instruction to Insert or an Instruction to not Insert the Extension Headers in the STAMP Test Packet Header 720 Insert, Based on the STAMP Test Packet Including the Instruction to Insert, Hop-by-Hop and Edge-to-Edge Extension Headers into a Reply Stamp Test Packet Header for Two-Way Performance Measurements 725 Do not Insert, Based on the STAMP Test Packet Including the Instruction to not Insert, Hop-by-Hop and Edge-to-Edge Extension Headers into a Reply Stamp Test Packet Header for One-Way Performance Measurements 730 Transmit the Reply STAMP Test Packet back to the Originating Session Sender 735 End

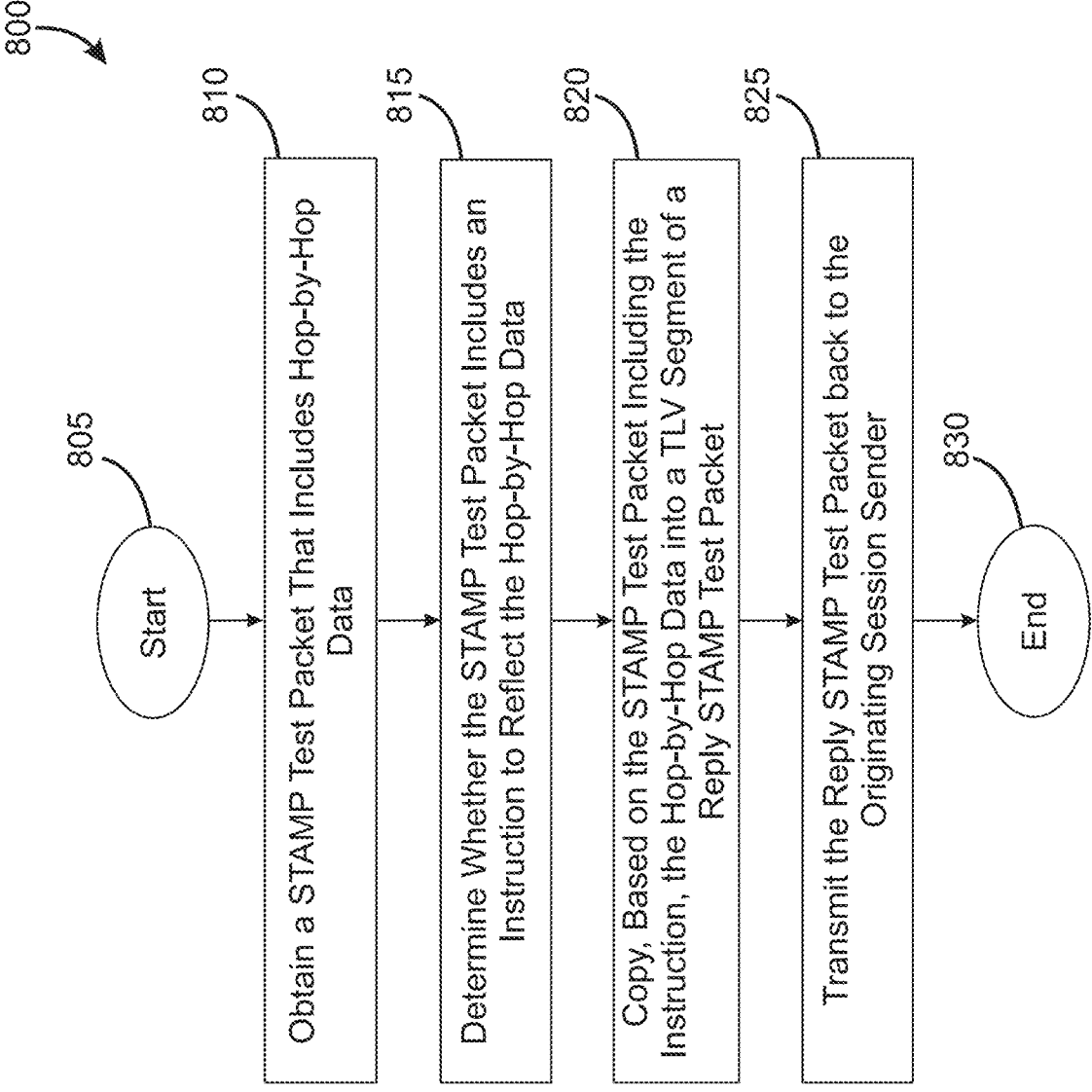

805 Start

810 Obtain a STAMP Test Packet That Includes Hop-by-Hop Data

815 Determine Whether the STAMP Test Packet Includes an Instruction to Reflect the Hop-by-Hop Data 820 Copy, Based on the STAMP Test Packet Including the Instruction, the Hop-by-Hop Data into a TLV Segment of a Reply STAMP Test Packet 825 Transmit the Reply STAMP Test Packet back to the Originating Session Sender 830 End

EXTENSIONS TO SIMPLE TWO-WAY ACTIVE MEASUREMENT PROTOCOL PACKETS

TECHNICAL FIELD

The present disclosure relates generally to computer networks, and, more particularly, to extensions to simple two-way active measurement protocol packets.

BACKGROUND

The ability to accurately measure and monitor network performance in modern network architectures is critical for maintaining service quality and operational efficiency. Various network performance measurement protocols have been developed to address these needs. One such protocol, the Simple Two-way Active Measurement Protocol (STAMP), provides capabilities for the measurement of various performance metrics in IP networks without the use of a control channel to pre-signal session parameters. STAMP may be used to measure parameters like latency and packet loss between two points in a network by test packets sent between a session sender and a session reflector that assess these network conditions.

While STAMP and similar protocols provide foundational data on network performances, they lack the capability to gather detailed granular operational and telemetry data across network paths. Instead, the protocol focuses on end-to-end (E2E) performance metrics and does not capture detailed data at each network node traversed by the packets. Therefore, while STAMP test packets ultimately lack the data depth and granularity to diagnose specific network issues or inefficiencies that can occur at intermediate nodes along the network path. Further, there is currently no accepted methodology defined for sending detailed operational and telemetry data back to an originating sender so that the sender can use that information for network performance monitoring. As networks continue to grow in complexity and scale, these deficiencies continue to mount, further eroding network performance monitoring capabilities and network performance.

BRIEF DESCRIPTION OF THE DRAWINGS

The implementations herein may be better understood by referring to the following description in conjunction with the accompanying drawings in which like reference numerals indicate identically or functionally similar elements, of which:

FIGS. 6A-6B illustrate an example of test packets with Generic Reflected Extension Header Data TLVs;

FIG. 7 illustrates an example of a simplified procedure for utilizing extensions to STAMP packets for one-way and two-way measurements; and FIG. 8 illustrates an example of a simplified procedure for utilizing extensions to STAMP packets, in accordance with one or more implementation described herein.

DESCRIPTION OF EXAMPLE IMPLEMENTATIONS

Overview

Figure 1A:
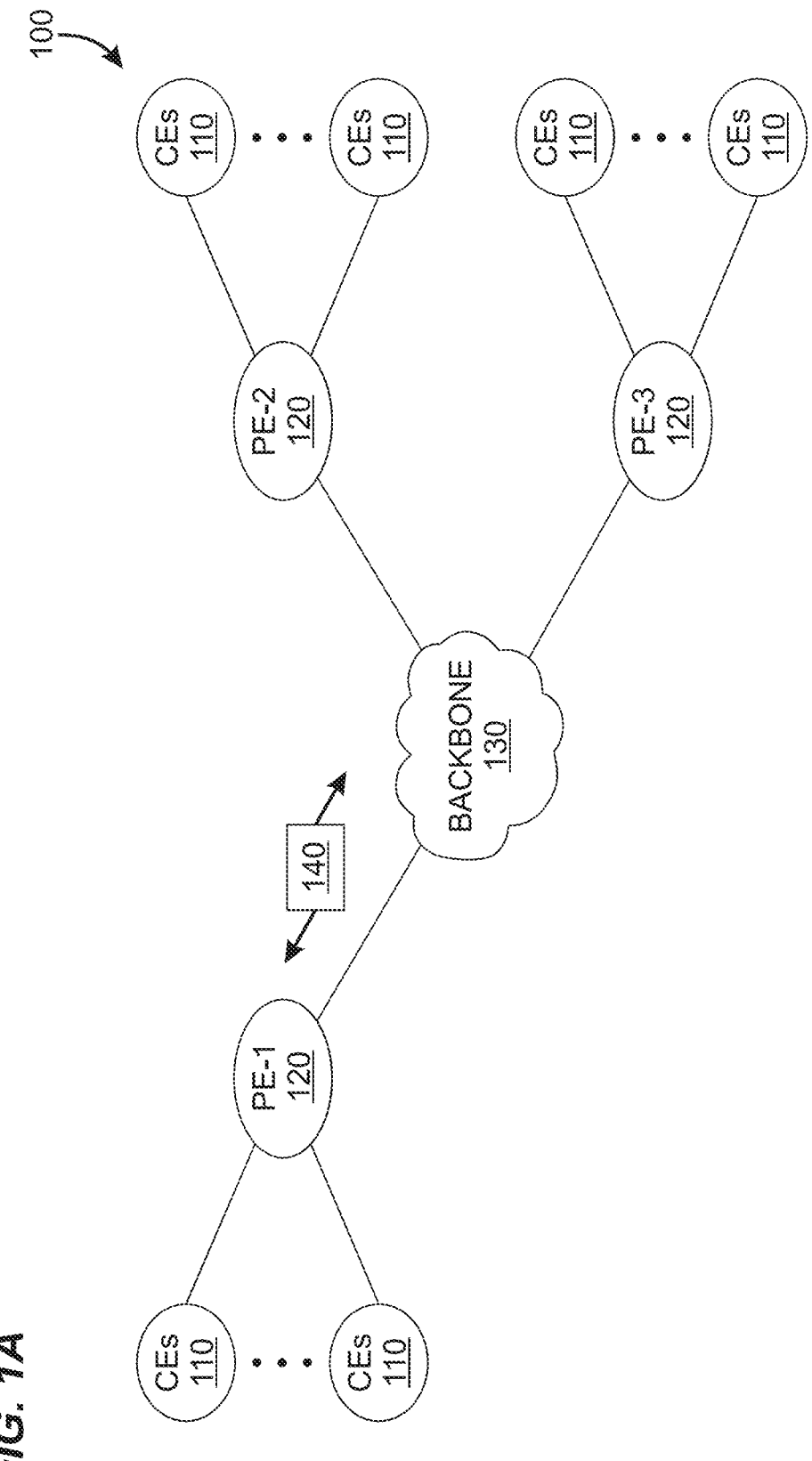
FIGS. 1A-1B illustrate an example communication network.

According to one or more implementations of the disclosure, a device may obtain a Simple Two-way Active Measurement Protocol test packet that includes hop-by-hop and/or end-to-end data collected by the Simple Two-way Active Measurement Protocol test packet along its path. The device may determine whether the Simple Two-way Active Measurement Protocol test packet includes an instruction to reflect the hop-by-hop and/or end-to-end data back to an originating session sender. The device may copy, based on a determination that the Simple Two-way Active Measurement Protocol test packet includes the instruction, the hop-by-hop and/or end-to-end data into a type-length-value segment of a reply Simple Two-way Active Measurement Protocol test packet. The device may transmit the reply Simple Two-way Active Measurement Protocol test packet back to the originating session sender.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers (e.g., CE router(s) 110) may be interconnected with provider edge (PE) routers (e.g., PE router(s) 120) (e.g., PE-1, PE-2, and PE-3) in order to communicate across a core network, such as an illustrative network backbone (e.g., network backbone 130). For example, CE router(s) 110, PE router(s) 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router(s) 110 shown in computer network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to computer network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router (e.g., CE router(s) 110) connected to PE-2 and a second CE router (e.g., CE router(s) 110) connected to PE-3.

Figure 1B:
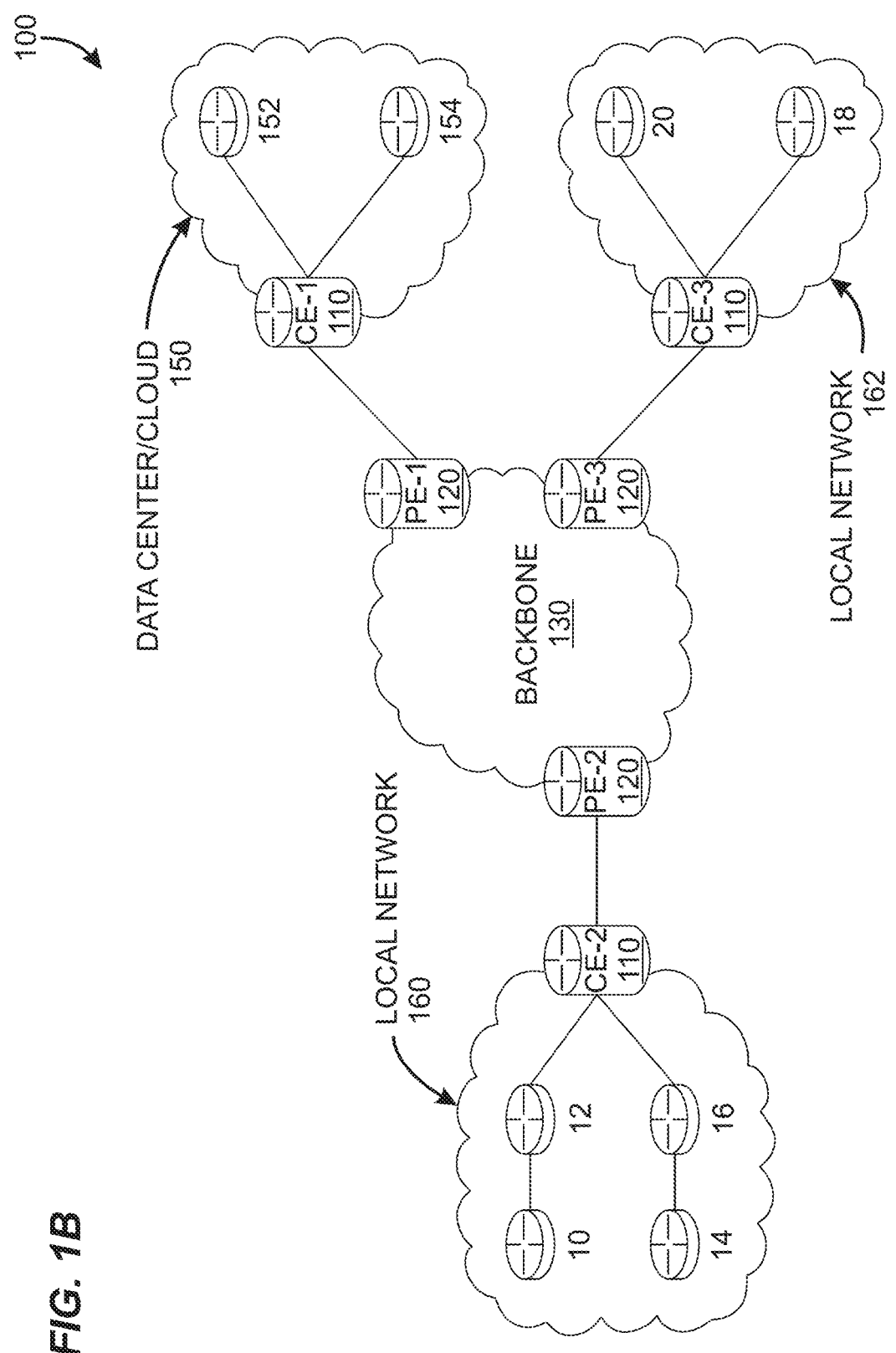

FIG. 1B illustrates an example of computer network 100 in greater detail, according to various implementations. As shown, network backbone 130 may provide connectivity between devices located in different geographical areas and/or different types of local networks. For example, computer network 100 may comprise local/branch networks (e.g., network 160, network 162) that include devices/nodes 10-16 and devices/nodes 18-20, respectively, as well as a data center/cloud environment 150 that includes servers 152-154. Notably, local networks (e.g., network 160, network 162) and data center/cloud environment 150 may be located in different geographic locations.

Servers 152-154 may include, in various implementations, a network management server (NMS), network performance analytics server, a dynamic host configuration protocol (DHCP) server, a constrained application protocol (CoAP) server, an outage management system (OMS), an application policy infrastructure controller (APIC), an application server, etc. As would be appreciated, computer network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in computer network 100 to connect local network (e.g., network 160), local network (e.g., network 162), and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network (e.g., network 160) to router CE-1 at the edge of data center/cloud environment 150 over an MPLS or Internet-based service provider network in network backbone 130. Similarly, a second tunnel may also connect these routers over a 4G/5G/LTE cellular service provider network. SD-WAN techniques allow the WAN functions to be virtualized, essentially forming a virtual connection between local network (e.g., network 160) and data center/cloud environment 150 on top of the various underlying connections. Another feature of SD-WAN is centralized management by a supervisory service that can monitor and adjust the various connections, as needed.

Figure 2:
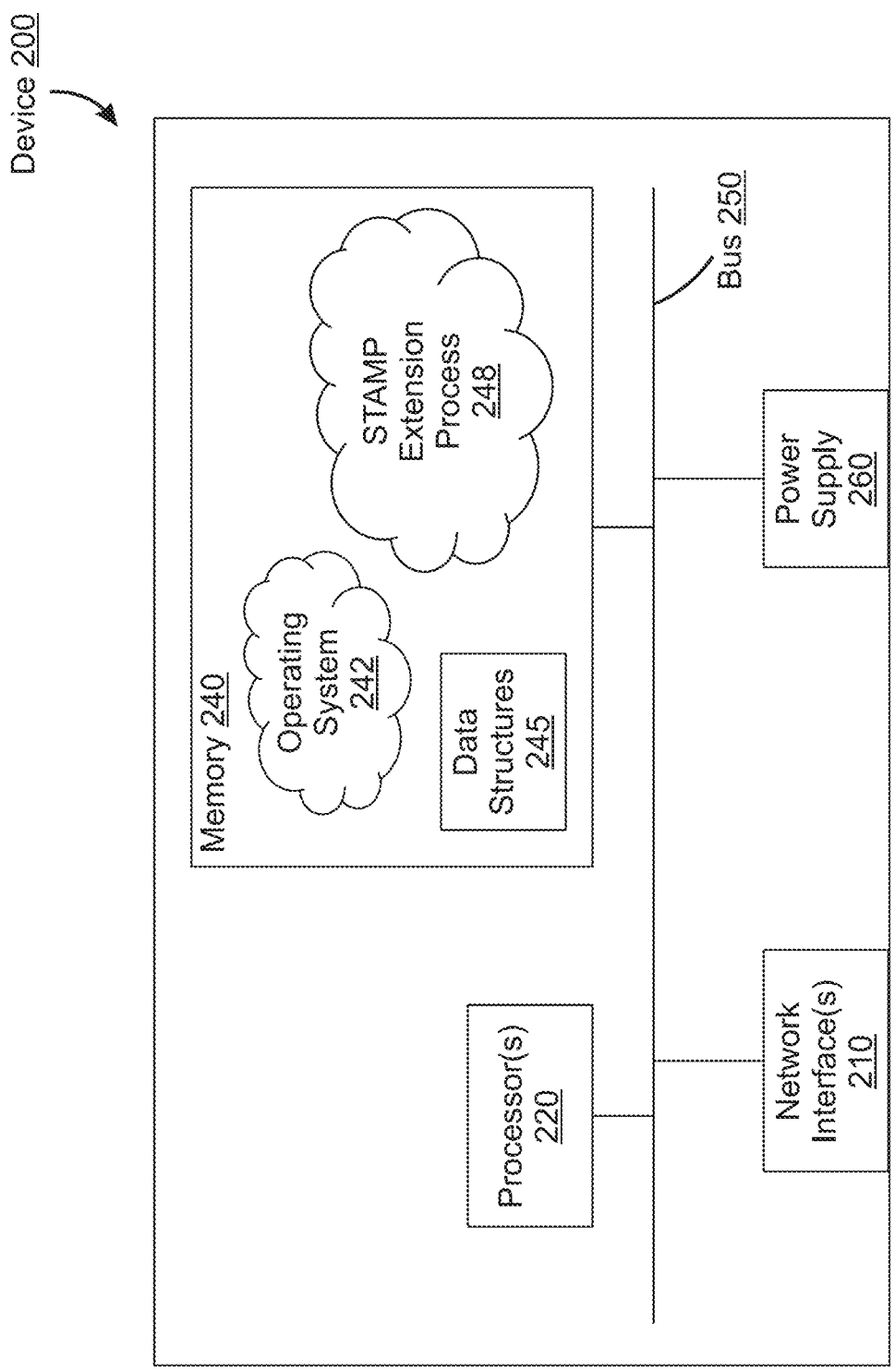
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE router(s) 120, CE router(s) 110, nodes/device 10-20, servers 152-154 (e.g., a network controller/supervisory service located in a data center, etc.), any other computing device that supports the operations of computer network 100 (e.g., switches, etc.), or any of the other devices referenced below. The device 200 may also be any other suitable type of device depending upon the type of network architecture in place, such as IoT nodes, etc. Device 200 comprises one or more of network interfaces 210, one or more of processor(s) 220, and a memory 240 interconnected by a system bus 250, and is powered by a power supply 260.

The network interfaces 210 include the mechanical, electrical, and signaling circuitry for communicating data over physical links coupled to the computer network 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a STAMP extension process 248 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, STAMP extension process 248 may include computer executable instructions that, when executed by processor(s) 220, cause device 200 to perform the techniques described herein. To do so, in some implementations, STAMP extension process 248 may utilize and/or involve operations of machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, STAMP extension process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that STAMP extension process 248 can employ and/or involve may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, STAMP extension process 248 may also include and/or involve the operations of one or more generative artificial intelligence/machine learning models. In contrast to discriminative models that simply seek to perform pattern matching for purposes such as anomaly detection, classification, security, data privacy, data sovereignty with geo-location, time-sensitive networking, or the like, generative approaches instead seek to generate new content or other data (e.g., audio, video/images, text, etc.), based on an existing body of training data. For instance, in the context of network assurance, STAMP extension process 248 may use a generative model to generate synthetic network traffic based on existing user traffic to test how the network reacts. Example generative approaches can include, but are not limited to, generative adversarial networks (GANs), large language models (LLMs), other transformer models, and the like.

As noted above, there is increasing demand to monitor performance latency, jitter, packet loss, and liveness (e.g., connectivity) in service provider and data center networks in order to provide guaranteed service and rapidly detect and isolate the problems in these networks. Further, there is increasing utility in collecting performance data from the network for network-wide analytics, to enable AI and machine learning to improve the network efficiency, to prevent network service degradation and outages and for predictive networking, etc.

Monitoring performance and Operations, Administration, and Maintenance (OAM) of data traffic flow using synthetic probe messages is referred to as active measurement, while using the actual customer traffic flow is referred to as passive measurement. The Simple Two-Way Active Measurement Protocol (STAMP), as defined in corresponding industry standard definitions, provides capabilities for the measurement of various performance metrics in IP networks without the use of a control channel to pre-signal session parameters. STAMP test packets are transmitted along a path between a Session-Sender and a Session-Reflector to measure end-to-end performance delay and packet loss along that path. Industry standard definitions also define optional extensions, in the form of TLVs, for STAMP.

IPv6 packets can carry IPv6 extensions headers including IPv6 Routing headers (e.g., Segment Routing Header (SRH) and IPv6 options of Hop-By-Hop (HBH) and destination types, etc., as defined in corresponding industry standard definitions. In addition, MPLS packets can carry MPLS Network Action (MNA) Sub-Stack(s) with processing scope of HBH, E2E and Selected Node, including in-stack data (ISD) and post-stack data (PSD) and network action opcodes, also referred to as MPLS extension headers, as defined in corresponding industry standard definitions.

In Situ Operations, Administration, and Maintenance (IOAM) may be utilized for recording and collecting operational and telemetry information while the packet traverses a path between two points in the network. The term "in-situ" may refer to the fact that the IOAM data fields are added to the data packets rather than being sent within the probe (or test) packets specifically dedicated to OAM. The IOAM data fields are defined and further updated (e.g., for direct export use-cases and telemetry) in corresponding industry standard definitions. When In Situ OAM is enabled on data packets, all data packets of a traffic flow may carry extension headers, it may require nodes to add and update those extension headers for all data packets, resulting in additional processing load in hardware that affects line rate packet processing and throughput. To alleviate this processing load, data packets may be sampled to collect HBH and E2E measurement data resulting in additional complexity.

Alternate Marking Method (AMM) may be utilized for collecting operational and telemetry data while the packet traverses a path between two points in the network where action on the node is triggered by packet marking bit(s) that alternate. IPv6 packets carry IPv6 extension header with HBH and Destination option type for alternate marking. Whereas MPLS packets carry MPLS Sub-Stack with HBH, Select and Destination processing scope for alternate marking. Alternate marking method may be combined with NetFlow (using IPFIX) to collect and aggregate performance data on each node on the path of the packet and sending them to a network controller via telemetry for HBH and E2E measurements.

Examples of data recorded by IOAM trace options may include per-hop information (e.g., node ID, timestamp, queue depth, interface ID, interface load, packet counters, geographic location of the node, power utilization metric (of links/nodes), security key, etc.). The information collected may be used, for example, for monitoring equal cost multiple path (ECMP) paths, proof-of-transit (POT), troubleshooting failures in the network, root-cause analysis, monitoring SLAs, detecting anomalies, network observability and visualization, tracing packet path in the network, predicting future failures, etc. Currently there is no accepted method defined to send the collected IOAM data fields back to the sender where the sender can use that information to provide the relevant use-cases.

In addition, path tracing (PT) may provide a record of the packet path as a sequence of interface IDs. Further, it may provide a record of end-to-end delay, per-hop delay, load on each egress interface along the packet delivery path, etc. The PT source node may generate PT probes with IPv6 options to record midpoint data, towards the sink node, to measure the different ECMP paths between the source and the sink nodes. Once those packets traverse the network, they are encapsulated and forwarded to the PT collector (e.g., as part of the PT analytics controller running on a compute node, etc.) where the information collected along the packet delivery path is processed. PT is currently implemented at line-rate in the base pipeline across several ASICs. Currently, PT packets are unidirectional and not transmitted back to the sender (or source) node once those packets traverse the network with recorded PT information (such as interface IDs, timestamps and interface load) by the sink node. Furthermore, PT requires clocks on the nodes to be synchronized for delay metrics computations, as probes do not traverse in the forward and reverse direction of the midpoint node collecting timestamps in both directions to be able to compute two-way delay metrics that does not need clock synchronization.

However, there is ultimately no mechanism to record and collect granular HBH and E2E operational and telemetry information using active measurement packets in both directions between two nodes in a network. Existing protocols like STAMP provide basic performance metrics such as latency and packet loss, but they fall short in delivering detailed, node-by-node operational insights and comprehensive E2E telemetry. As a result, network operators face significant challenges in pinpointing the exact locations and causes of performance degradation as well as detecting SLA guarantee violations promptly.

Without detailed HBH telemetry, diagnosing issues like intermittent packet loss or fluctuating latency becomes an arduous task, often leading to prolonged downtimes and increased maintenance costs. Furthermore, the current inability to capture E2E operational data in both directions impedes the ability to accurately assess overall network health, potentially allowing failures and inefficiencies to go undetected. This deficiency also hinders the optimization of traffic routing and load balancing, as granular insights into each network segment's performance are unavailable. Consequently, the network's ability to meet service level agreements (SLAs) is compromised, impacting the reliability and quality of service delivered to end users.

Additionally, without comprehensive HBH data, it is impossible to detect if fewer than all expected network paths are being utilized or if there are security breaches where packets are being redirected to unauthorized locations, potentially exposing sensitive data to malicious entities. In essence, while STAMP provides foundational metrics, it lacks the necessary tools for comprehensive, real-time network diagnostics and performance management, leaving critical gaps in network operations, analytics, administration, and maintenance. For example, using the pre-configured hash-keys on each node on the packet path that can be decoded and verified by STAMP test packets to make sure that the STAMP test packets and thereby traffic only travel trusted devices on the internet. Time-to-live (TTL) field in the reflected STAMP test packet may be used to compare with reflected recorded HBH data to see if any node had skipped the recording of the HBH data in the STAMP test packets.

Further, delay metrics computed using the STAMP test packets with HBH and E2E measurements may also be used to decide to forward or drop data traffic in time-sensitive network (TSN) at the originating sender node.

In another example, power utilization metrics collected in HBH data may be used to optimize power utilization in the network (GREEN network use-case) for low carbon footprint. Sender node may use the HBH information collected for interface load and power utilization to notify the network controller of power anomaly detected as indicated by low traffic load on the interface and higher power utilization, as an example.

—Extensions to Simple Two-Way Active Measurement Protocol Packets—

In contrast, the techniques herein introduce a mechanism to dynamically and/or selectively record and collect HBH and E2E operational and telemetry information using active measurement packets in both directions between two nodes in a network. These techniques may extend industry standard definitions associated with STAMP to carry IOAM data fields and may augment the optional extensions defined in corresponding industry standard definitions to reflect the augmentations. For example, the techniques may extend STAMP packets to selectively carry HBH and E2E IOAM data fields (including PT data fields) for hop-by-hop and end-to-end active measurement and telemetry in both directions.

The mechanism may leverage existing IOAM (and PT) data on midpoint nodes without any data plane changes. The STAMP extensions may facilitate the Session-Reflector nodes in reflecting the received IPv6 option and MPLS Network Action (MNA) Sub-Stacks in optional STAMP TLV. The STAMP extensions may be generic (and not limited to IOAM or PT) and facilitate selective reflection of any type of IPV6 extension header and option and MPLS Network Action Sub-Stacks (also called MPLS extension headers) with In-Stack Data (ISD and Post-Stack Data (PSD) in Session-Reflector test packets. The STAMP extensions may be configured to maintain symmetric test packet size in both directions.

Illustratively, the techniques described herein may be performed by hardware, software, and/or firmware, such as in accordance with STAMP extension process 248, which may include computer executable instructions executed by the processor(s) 220 (or independent processor of network interfaces 210) to perform functions relating to the techniques described herein.

Specifically, according to various implementations, a device may device may obtain a Simple Two-way Active Measurement Protocol test packet that includes hop-by-hop data collected by the Simple Two-way Active Measurement Protocol test packet along its path. The device may determine whether the Simple Two-way Active Measurement Protocol test packet includes an instruction to reflect the hop-by-hop data back to an originating session sender. The device may copy, based on a determination that the Simple Two-way Active Measurement Protocol test packet includes the instruction, the hop-by-hop data into a type-length-value segment of a reply Simple Two-way Active Measurement Protocol test packet. The device may transmit the reply Simple Two-way Active Measurement Protocol test packet back to the originating session sender.

Figure 3:
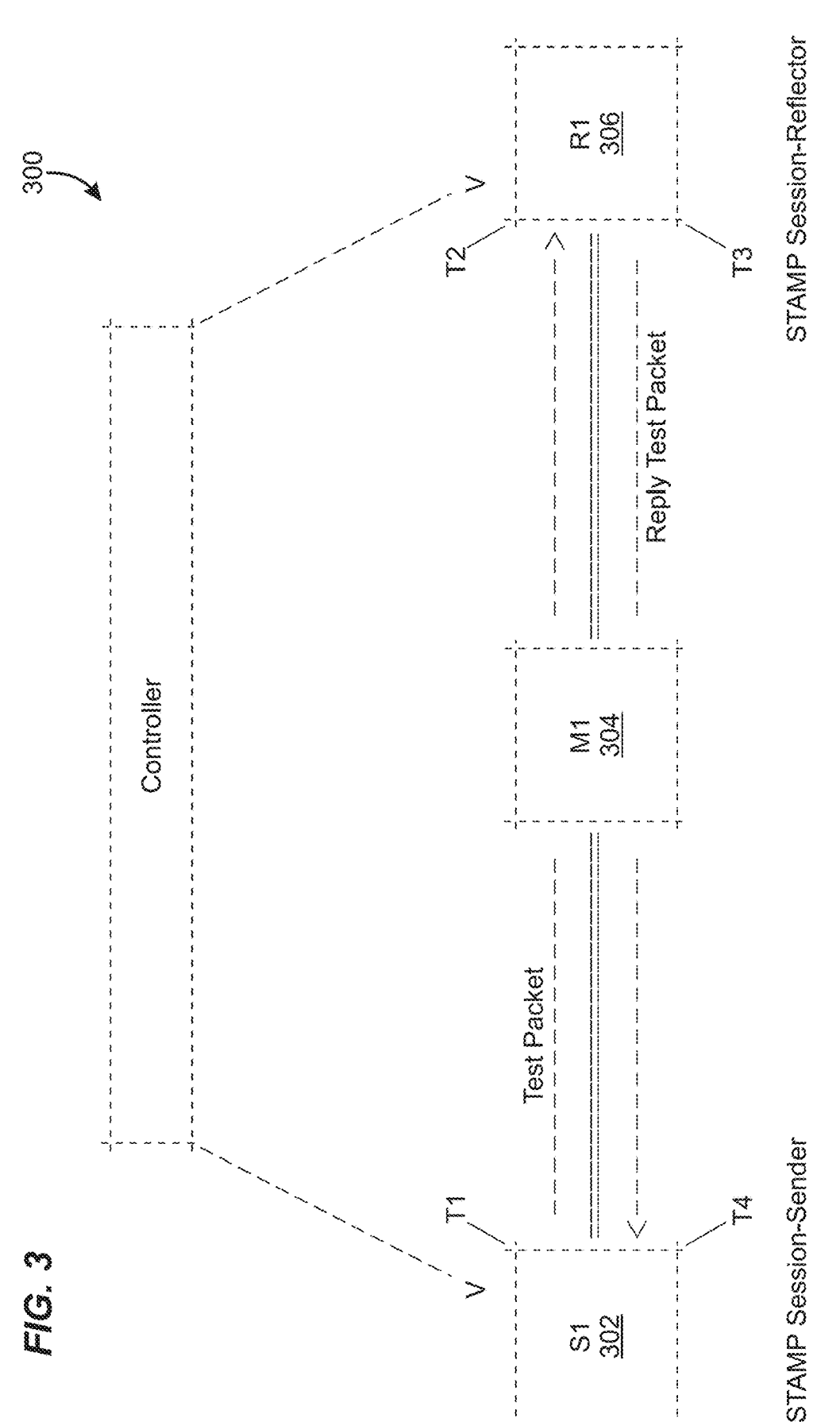
FIG. 3 illustrates an example of an extendable STAMP reference topology.

Operationally, FIG. 3 illustrates an example of a STAMP reference topology 300 within which STAMP extensions may be utilized to dynamically and/or selectively record and collect HBH and E2E operational and telemetry information using active measurement packets in both directions between two nodes in a network, in accordance with one or more implementation described herein. STAMP reference topology 300 may include a Session-Sender (node S1 302). Node S1 302 may initiate a STAMP test packet that is transmitted across one or more midpoint nodes such as node M1 304 to a Session-Reflector (node R1 306). Node R1 306 may transmit a reply STAMP test packet. Here, T1 may be a transmit timestamp and T4 may be a receive timestamp, both added by node S1 302. T2 may be a receive timestamp and T3 may be a transmit timestamp, both added by node R1 306.

Traditionally, midpoint nodes, such as node M1 304, do not perform any STAMP processing. The HBH and E2E IOAM option types may be added by node S1 302 in Session-Sender test packets. Similarly, they may be added by node R1 306 in Session-Reflector test packets. The HBH IOAM options may be processed by a midpoint node (e.g., node M1 304). The E2E options may be processed by the STAMP nodes (node S1 302 and node R1 306). The proposed STAMP extensions, outlined in greater detail below, may be applied within STAMP reference topology 300 to configure STAMP test packets to selectively carry HBH and E2E IOAM data fields (including PT data fields) for hop-by-hop and end-to-end active measurement and telemetry in both directions.

Figures 4A, 4B:
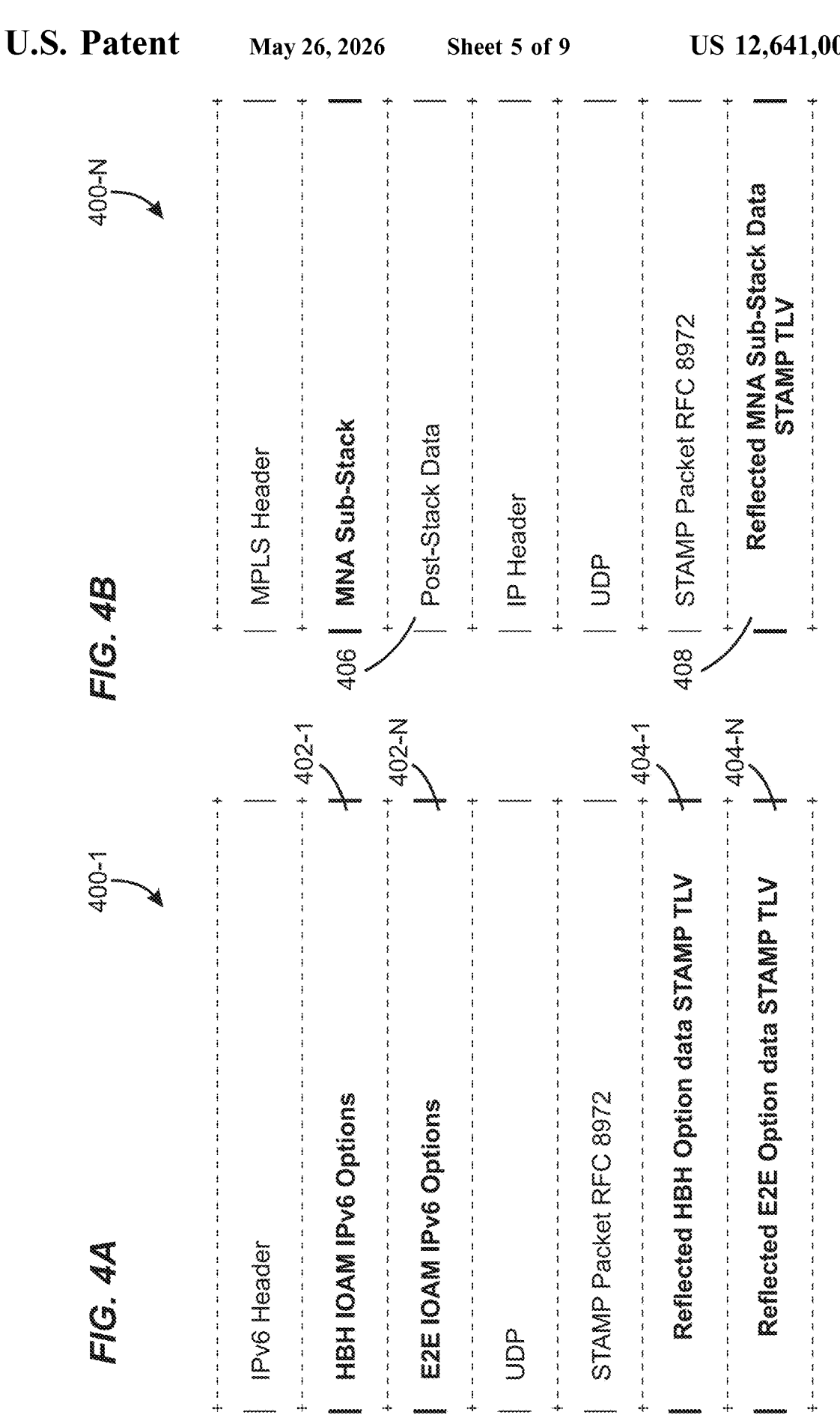
FIGS. 4A-4B illustrate examples of STAMP test packets configured for the selective carrying of HBH and E2E IOAM data fields.

FIGS. 4A-4B illustrate examples of STAMP test packets 400 (e.g., STAMP test packet 400-1 with reflected IPv6 option data STAMP TLV and STAMP test packet 400-2 with reflected MNA data STAMP TLV) configured for the selective carrying of HBH and E2E IOAM data fields (including PT data fields) for hop-by-hop and end-to-end active measurement and telemetry in both directions, in accordance with one or more implementation described herein. The STAMP test packets 400 may be extended to generically carry any IPv6 and/or MPLS MNA (including but not limited to IOAM and PT) headers including alternate marking, performance and diagnostic metrics, maximum path MTU options, network slicing, routing, transport, enhanced VPN, Flow Identifier, etc.

As described above, industry standard definitions define optional extensions for STAMP. The optional extensions may be added in base STAMP packets in the form of TLVs as defined in corresponding industry standard definitions. As specified in the STAMP industry standard definitions, both Session-Sender and Session-Reflector packets are symmetric in size when including all optional TLVs. The Session-Reflector may reflect all received STAMP TLVs from the Session-Sender test packets. Further, Session-Reflector may also reflect IPv6/IPV4 header, GRE header, VXLAN header, UDP header, VLAN header and MPLS header including all their fields such as source address, destination address, flow label, hop limit, time-to-live, traffic class, processing node 20) scope, entropy label, EXP bits, VLAN ID, UDP ports, and so on reflected data STAMP TLV.

STAMP test packet 400-1 may be configured with a Reflected IPv6 option data STAMP TLV. "Reflected IPv6 Option Data" (e.g., value TBA1) represents an extended TLV option proposed for STAMP in the IPV6 data plane. When a STAMP Session-Sender adds an IPV6 option in IPV6 header (e.g., HBH IOAM IPv6 Options 402-1, E2E IOAM IPv6 Options 402-N, etc.), it may also add "Reflected IPv6 Option Data" STAMP TLV (e.g., HBH Option Data STAMP TLV 404-1, E2E Option Data STAMP TLV 404-N, etc.) in the packet. This optional data STAMP TLV may be configured to the size of the IPv6 option length including IPv6 option header bytes and value initialized to zeros. When adding multiple IPv6 options in the packet, multiple "Reflected IPV6 Header data" TLVs may be required to be added, each one with matching length with the IPV6 option and in the same order. The Reflected IPV6 Header Data STAMP TLV may be added with the first 4 bytes (as an example) (that contains type, length and other encoding information) of the IPV6 extension header by the Sender. The Reflector matches these fields in the reflected data STAMP TLV to copy the matching IPv6 extension header from the received STAMP test packet header to overcome the ambiguity when there are multiple IPv6 extension headers with the same length and not all of them need to be copied and reflected to the originating sender.

When Session-Reflector receives STAMP packet with IPv6 option and STAMP TLV of "Reflected IPv6 Option Data", the Session-Reflector that supports this STAMP TLV, may copy the entire IPv6 option including the header into the STAMP "Reflected IPv6 Option Data" TLV in Session-Reflector payload. The Session-Reflector may also add the matching IPv6 option in the IPV6 header of the Session-Reflector test packet for the reverse direction. When there are multiple IPv6 options in the packet, all IPv6 options may be copied in the STAMP "Reflected IPV6 Option Data" TLVs and/or all IPv6 options may be added in the IPV6 header of the Session-Reflector test packet.

STAMP test packet 400-N may be configured with a Reflected MNA option data STAMP TLV. "Reflected MNA Data" (e.g., value TBA2) represents an extended TLV option proposed for STAMP in the MPLS data plane. When a STAMP Session-Sender adds an MNA Sub-Stack (e.g., MNA Sub-stack 406) in the packet, it may also add "Reflected MNA Data" STAMP TLV (e.g., MNA Data STAMP TLV 408) in the packet. The "Reflected MNA Data" STAMP TLV may be configured to the size of the MNA length including In-Stack and Post-Stack Data and including MNA header bytes and value initialized to zeros. When adding multiple MNA Sub Stacks in the packet, multiple "Reflected MNA Data" TLVs may be required to be added, each one with matching length with the MNA Sub-Stack and ancillary data and in the same order. The Reflected MPLS MNA Data STAMP TLV may be added with the first 8 bytes (as an example) (that contains type, length, opcode, scope, flags, and other encoding information) of the MPLS Sub-Stack header by the Sender. The reflector may match these fields in the reflected data STAMP TLV to copy the matching MPLS Sub-Stack from the received STAMP test packet header to overcome the ambiguity when there are multiple MNA sub-stacks with the same length and not all of them need to be copied and reflected to the originating sender.

When Session-Reflector receives a STAMP packet with MNA and STAMP TLV of "Reflected MNA Data", the Session-Reflector that supports this STAMP TLV, may be required to copy the entire MNA Sub-Stack, ancillary data including the header into the "Reflected MNA Data" TLV in Session-Reflector payload. The Session-Reflector also may be required to add the matching MNA Sub-Stacks and Ancillary Data in the MPLS header of the Session-Reflector test packet for the reverse direction. When there are multiple MNA Sub-Stacks in the packet, all MNA Sub-Stacks including ancillary data may be required to be copied in the STAMP TLVs and/or may be required to add all MNA Sub-Stacks including Ancillary Data in the Session-Reflector test packet.

Figures 5A, 5B:
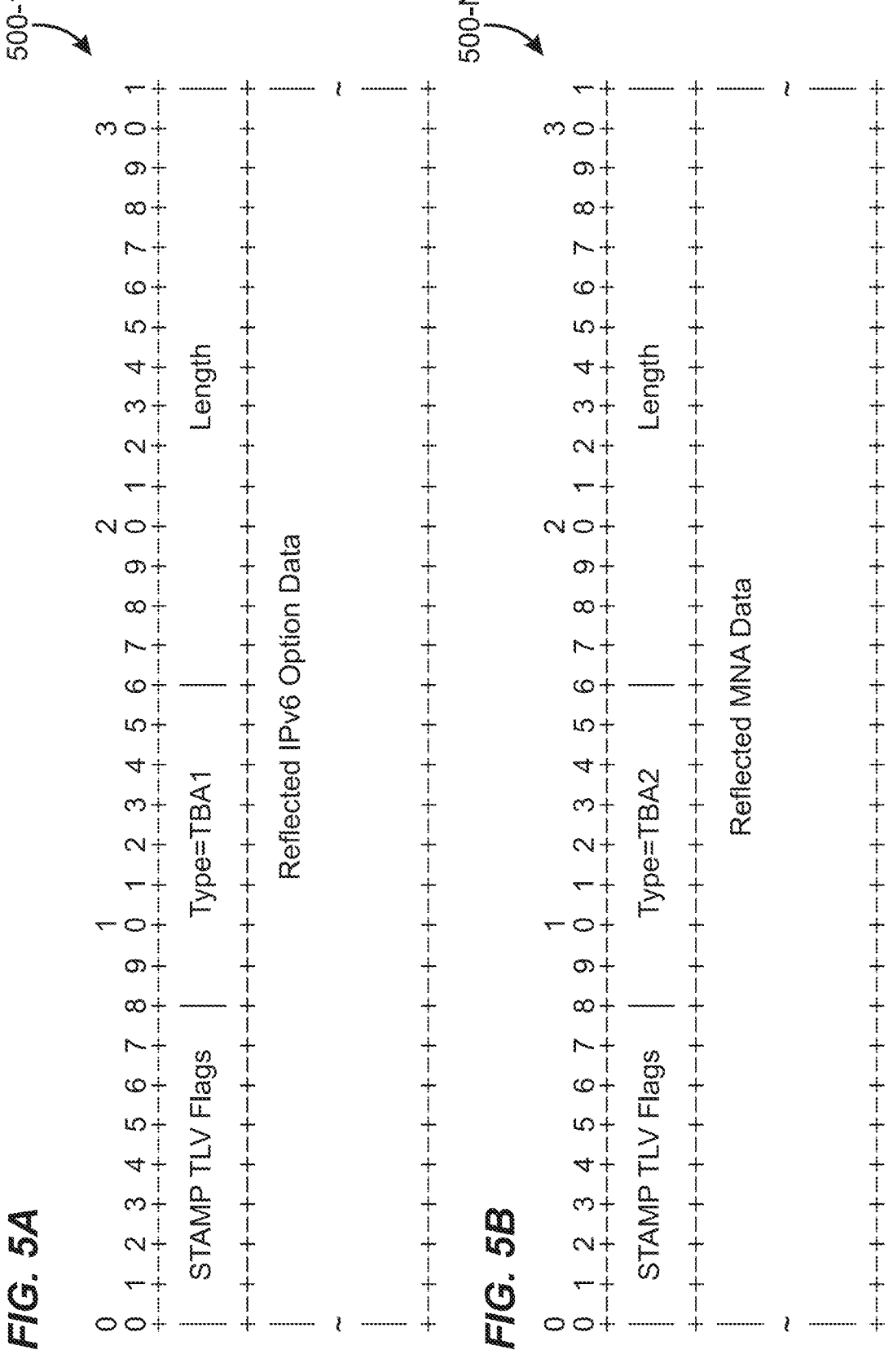
FIG. 5A-5B illustrate examples of reflected option data STAMP TLVs when utilizing extensions to STAMP packets.

FIG. 5A-5B illustrate examples of Reflected Option Data STAMP TLVs 500 (e.g., Reflected IPv6 Option Data STAMP TLV 500-1, Reflected MNA Data STAMP TLV 500-N, etc.) when utilizing extensions to simple two-way active measurement protocol packets, in accordance with one or more implementation described herein. Reflected Option Data STAMP TLVs 500 may be carried by Session-Sender and/or Session-Reflector test packets.

For example, reflected IPv6 Option Data STAMP TLV 500-1 may be carried by Session-Sender and Session-Reflector test packets. STAMP test packets may carry multiple TLVs of this type. The TLV fields may be defined as follows:

Type: Type (Value TBA1); STAMP TLV Flags: The STAMP TLV Flags may follow the procedures defined in industry standard definitions associated with optional STAMP extensions; Length: A two-octet field equal to the length of the data in octets.

In additional examples, Reflected MNA Data STAMP TLV 500-N may be carried by Session-Sender and Session-Reflector test packets. STAMP test packets may carry multiple TLVs of this type. The TLV fields may be defined as follows: Type: Type (Value TBA2); STAMP TLV Flags: The STAMP TLV Flags may follow the procedures defined in industry standard definitions associated with optional STAMP extensions; Length: A two-octet field equal to the length of the data in octets.

FIGS. 6A-6B illustrate an example of test packets 600 with Generic Reflected extension header Data TLVs (e.g., test packet 600-1 in FIG. 6A with Generic Reflected IPv6 Extension Header Data TLV, test packet 600-N in FIG. 6B with Generic Reflected MNA Sub-Stack Data STAMP TLV, etc.), in accordance with one or more implementation described herein. In various implementations, the described procedures and extensions may be generic and/or facilitate carrying and reflecting of any IPv6 option and MPLS Network Action Sub-Stack data in both directions.

For example, the described procedures and extensions for STAMP for the IPV6 data plane may be generic and may be used by the Session-Sender and Session-Reflector test packets to reflect any IPv6 option (not just limited to the IPV6 options with IOAM data fields) for HBH and E2E two-way active measurement. For example, Alternate Marking Method (AMM) destination option as defined in associated industry standard definitions, Performance and Diagnostic Metrics (PDM) as defined in associated industry standard definitions, Maximum Path MTU option as defined in associated industry standard definitions, and/or any IPv6 option or MNA Sub-Stacks that may be defined in future for OAM, PM, Direct-Export, NetFlow, Telemetry, etc. may be utilized.

Likewise, the described procedures and extensions for STAMP for MPLS data plane may be generic. As such, they may be utilized by Session-Sender and Session-Reflector test packets to reflect any MNA Sub-Stack for HBH and E2E two-way active measurement.

In addition, path tracing probe packets may carry PT HBH IPv6 option and Destination IPv6 option. The described procedures and extensions may be utilized to carry PT HBH IPv6 option in a STAMP IPv6 header of the Session-Sender test packets and/or be reflected in the STAMP TLV of the Session-Reflector test packets.

In various implementations, the described procedures and extensions may support asymmetric one-way measurement. For example, the procedures and extensions may cause STAMP data collection to be operated in an asymmetric mode, such as only performing the measurements in the forward direction and/or to avoid measurements in the reverse direction. For instance, a STAMP TLV extension may be utilized to control the reverse direction extension headers.

In some instances, measurement may only be required in the Session-Sender to the Session-Reflector direction. Measurement may not be required in the Session-Reflector to the Session-Sender direction.

A Sub-TLV "Extension Header Control" (Type TBA3) may be defined and utilized for the STAMP TLV "Reflected Test Packet Control TLV," as defined in associated industry standard definitions. When a Session-Sender Test Packet is received with an "Extension Header Control" Sub-TLV, the Session-Reflector will not add (IPv6/MNA) Extension Headers in the Header of the Session-Reflector Test Packet. In some instances, Session-Reflector may still copy the (IPv6/MNA) Extension Headers from the Session-Sender Test Packet into the Session-Reflector Test Packet STAMP TLVs (Type TBA1 and TBA2) (e.g., if they were received in the Session-Sender Test Packet). Symmetric test packet size in both directions may be maintained.

In various implementations, a STAMP TLV extension "Reflected Test Packet Control TLV," as defined in associated industry standard definitions, with a different Sub-TLV (e.g., "Extension Header Insert Request") may be utilized by the reflector to insert IPv6 extensions headers and MNA Sub-Stacks in the reply STAMP test packet header for two-way hop-by-hop and edge-to-edge measurements. The two-way latency for each hop may be computed using the four timestamps (e.g., TX and RX timestamps on sender and TX and RX timestamps on midpoint node), collected with two-way measurement in both directions, in the similar fashion as end-to end two-way latency computed as (T4–T1)–(T3–T2) as illustrated in FIG. 3.

As such, an extension to one-way and two-way STAMP protocol is provided for recording and collecting In Situ OAM (including Path Tracing) data for hop-by-hop and end-to-end active measurement (instead of extending other protocols such as ICMPv6 ping) in one or both directions of the STAMP session. In some instances, existing IOAM (including Path Tracing) data recording on midpoint nodes may be leveraged without any protocol or implementation changes and/or by only upgrading STAMP endpoint nodes in both directions. The reverse direction extension headers for asymmetric one-way measurement may be controlled by using STAMP extensions while still using symmetric STAMP packet payload size.

Further, STAMP protocol extensions are introduced for IPv6 and MPLS data planes for HBH and E2E active measurement for both use-cases of recording data in the packets as well as direct export and telemetry from nodes. A Session-Sender may send an empty STAMP TLV matching the length of IOAM/PT IPv6 option or MPLS MNA. Session-Reflector behavior may be configured to reflect IOAM (and/or including PT) options back in the received STAMP TLV to maintain symmetric (Sender and Reflector) test packet size.

The described STAMP protocol extension may be generic and may facilitate the carrying of any IPv6 extension header and option and MPLS Network Action (not limited to IOAM and Path Tracing data options), such as Alternate Marking Method (AMM) destination and hop-by-hop options as defined in associated industry standard definitions, Performance and Diagnostic Metrics (PDM) as defined in associated industry standard definitions, Maximum Path MTU option as defined in associated industry standard definitions, Routing header (such as Segment Routing header) as defined in associated industry standard definitions, and/or any IPv6 extension header and/or IPV6 option or MNA Sub-Stacks that may be defined in future for OAM, PM, Telemetry, Direct Export, NetFlow (using IPFIX), Routing, etc.

FIG. 7 illustrates an example of a flow diagram for a simplified procedure for utilizing extensions to STAMP packets for one-way and two-way measurements, in accordance with one or more implementation described herein. For example, a non-generic, specifically configured device (e.g., device 200), may perform procedure 700 (e.g., a method) by executing stored instructions (e.g., STAMP extension process 248).

The procedure 700 may start at step 705, and continues to step 710, where, as described in greater detail above, the device (e.g., a controller, processor, etc.) may obtain a STAMP test packet that includes hop-by-hop and edge-to-edge extension headers.

At step 715, as detailed above, a device may determine whether the STAMP test packet includes an instruction (e.g., instructive indicator, lack of an instructive indicator, a STAMP TLV including a destination address, etc.) to insert the extension headers in the stamp test packet header and/or an instruction (e.g., instructive indicator, lack of an instructive indicator, etc.) not to insert the extension headers in the stamp test packet header.

At step 720, as detailed above, a device may insert, based on the STAMP test packet including the instruction to insert the extension headers in the stamp test packet header, the hop-by-hop and edge-to-edge extension headers into a reply STAMP test packet header for a two-way performance measurement.

Alternatively, at step 725 the device may, based on the STAMP test packet including the instruction not to insert the extension headers in the stamp test packet header, refrain from inserting the hop-by-hop and edge-to-edge extension headers into a reply STAMP test packet header for a one-way performance measurement.

At step 730, as detailed above, the device may transmit the reply STAMP test packed back to the originating session sender. The reply STAMP test packet may or may not include the hop-by-hop and edge-to-edge extension headers inserted into its header based on whether the test stamp packet included the instruction to insert the extension headers or the instruction not to insert the extension headers.

Procedure 700 then ends at step 735.

FIG. 8 illustrates an example of a simplified procedure for utilizing extensions to simple two-way active measurement protocol packets, in accordance with one or more implementation described herein. For example, a non-generic, specifically configured device (e.g., device 200), may perform procedure 800 (e.g., a method) by executing stored instructions (e.g., STAMP extension process 248).

The procedure 800 may start at step 805, and continues to step 810, where, as described in greater detail above, the device (e.g., a controller, processor, etc.) may obtain a STAMP test packet. The STAMP test packet may include hop-by-hop (HBH) data collected by the STAMP test packed along its path. The HBH collected by the STAMP test packet along its path may include data collected from one or more intermediate nodes participating in a transmission of the STAMP test packet (e.g., along its path between the originating session sender node and a receiving session reflector node).

The HBH data may include HBH IOAM data collected in an IP header (e.g., an IPv6 header) of the STAMP test packet along its path. Additionally, or alternatively, HBH data may include HBH IOAM data collected in MPLS Network Action (MNA) Sub-Stack in a MLPS header (e.g., either as in-stack data (ISD) or post-stack data (PSD)) of the STAMP test packet along its path. The HBH data may also include path trace data, Alternate Marking Method (AMM) HBH and destination option data, Performance and Diagnostic Metrics (PDM) data, Maximum Path MTU option data, and/or any IPv6 option or MNA Sub-Stacks that may be defined in the future for OAM, PM, Telemetry, Direct Export, NetFlow (using IPFIX), Routing (e.g., MPLS header), etc.

The STAMP test packet may include one or more instructions (e.g., in the form of a TLV). These instructions may indicate whether the HBH data collected by the STAMP test packet should or should not be reflected back to an originating session sender. The instruction to reflect the hop-by-hop data back to an originating session sender may be included in the STAMP test packet as a TLV option.

The STAMP test packet may include one or more pre-allocated empty type-length-value segments. These empty TLV segments may be correspondingly sized to a payload size of hop-by-hop data collected by the STAMP test packet along its path. The TLV may contain additional information such as type and length of the extension header, option and MNA Sub-stack opcode, for hop-by-hop data to avoid an ambiguity when there are multiple extension headers, options and MNA Sub-Stacks with the same length in the STAMP test packet header and not all of them need to be copied and reflected to the originating sender. MNA Sub-Stack may contain a network action with an offset to Post-Stack Data added after the MPLS header in the MPLS packet and can be used to further reflect the MNA Sub-Stack and associated In-Stack and Post-Stack Data.

The STAMP test packet may include IPv6 extension header with HBH option or MPLS Network Action Sub-Stack with an additional instruction for the midpoint nodes. Using this instruction, midpoint node may transmit a copy of the received STAMP test packet with HBH data to all outgoing ECMP paths to the next node. This behavior may also be based on the type of the IPV6 HBH option or MPLS Network Action Sub-Stack opcode or some other indication in the STAMP test packet header. A single STAMP test packet from the originating sender for HBH measurement of all ECMP paths between Sender and Reflector may be used for all ECMP paths. This mechanism may greatly simplify the STAMP test packet generation at the Sender as it may not be able to traverse all ECMP paths at all midpoint nodes and may not be capable to generate necessary STAMP test packets.

In further implementation, the STAMP test packets carrying IPv6 extension headers and MPLS MNA Sub-Stacks for recording and collecting HBH and E2E information may run out of space in the test packet extension header and MNA Sub-Stack along the path and may stop recording HBH information. The midpoint node may detect this issue and trigger the behavior to reflect the STAMP test packet with copied extension header and MPLS network action sub-stack data into the reflected data STAMP TLV to the originating sender and send a copy of the STAMP test packet with new IPV6 extension headers and MNA Sub-Stacks to downstream nodes (e.g., reflect-and-forward behavior on a node).

As detailed above, a device may determine whether the STAMP test packet includes an instruction, for example, in the form of a STAMP TLV containing destination address of the analytics engine. The reflector may copy the HBH and E2E data from the STAMP test packet header into the Reflected STAMP Data TLVs and transmit the STAMP test packet to the destination address that was received in the STAMP TLV for network observability use cases. The collected data may be used by the digital twin (another instance of a digital map) on the network controller for network analytics, trouble-shooting issues, root-cause analysis, post-mortem analysis, and clustering (to associate failures to path-sharing), etc.

At step 815, as detailed above, a device may determine whether the STAMP test packet includes an instruction to reflect the HBH data back to an originating session sender.

At step 820, as detailed above, a device may copy, based on a determination that the STAMP test packet includes the instruction, the hop-by-hop data into a type-length-value segment of a reply STAMP test packet. An error may be returned to an originating session sender and/or an administrator when the type-length-value segment does not match a length of corresponding hop-by-hop data collected by the STAMP test packet along its path. Further, an error may also be returned to an originating session sender when a requested STAMP TLV or IPv6 extension header or MNA Sub-Stack network action is not locally supported or disabled by the administration using a local policy.

At step 825, as detailed above, the device may transmit the reply STAMP test packet back to the originating session sender. As previously described, the reply STAMP test packet may include the hop-by-hop data copied into its type-length-value segment in instances where the STAMP test packet included the instruction to reflect the hop-by-hop data back to the originating session sender. Alternatively, the reply STAMP test packet back may be transmitted to the originating session sender without copying the hop-by-hop data into the type-length-value segment based on a determination that the STAMP test packet does not include the instruction. In a further implementation, the device may include an indication in the reply Simple Two-way Active Measurement Protocol test packet that hop-by-hop data should not be collected along the path back to the originating session sender (e.g., via a STAMP TLV indicating asymmetric one-way measurement). In some instances, the device may also include an indication in the reply Simple Two-way Active Measurement Protocol test packet that one or more intermediate nodes along the path should collect and insert return hop-by-hop data into the reply Simple Two-way Active Measurement Protocol test packet.

In various implementations, a digital map may be generated of the paths in a network traversed by the STAMP test packet. This digital map may be generated using the hop-by-hop data copied into the type-length-value segment of the reply STAMP test packet. The digital map of the paths in the network traversed by the STAMP test packet may be utilized to identify an anomaly in a transmission of the STAMP test packet. For example, an analysis of the digital map may be performed to identify if fewer than all expected network transmission paths are being used for data transmission, if packets are being diverted from expected and/or permitted paths during transmission, etc. The expected network transmission paths may be computed using network topology database for such analysis and anomaly detection.

In further implementations, using the recorded geo-location in the form of latitude and longitude in the STAMP test packet HBH and E2E data and reflecting the collected data in reflected data STAMP TLV, the digital map may be enhanced to analyze the paths of the STAMP test packets in terms of streets, city, country and continent traversed by the STAMP test packets on the internet for data sovereignty monitoring for the similar data traffic flows.

Procedure 800 then ends at step 830.

It should be noted that while certain steps within procedures 700 and 800 may be optional as described above, the steps shown are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce a mechanism to dynamically and/or selectively record and collect HBH and E2E operational and telemetry information using active measurement packets in both directions between two nodes in a network. These techniques may extend industry standard definitions associated with STAMP to carry IOAM data fields and may augment the optional extensions defined in corresponding industry standard definitions to reflect the augmentations. For example, the techniques may extend STAMP packets to selectively carry HBH and E2E IOAM data fields (including PT data fields) for hop-by-hop and end-to-end active measurement and telemetry in both directions.

These extensions facilitate the collection and communication of detailed HBH telemetry, which can be utilized for diagnosing issues like intermittent packet loss or fluctuating latency, thereby decreasing downtimes and maintenance costs. Furthermore, the extensions' ability to capture and communicate E2E operational data in both directions facilitates accurate assessment of overall network health, expediting the detection of failures and inefficiencies. Furthermore, these extensions facilitate accurate granular data-driven optimization of traffic routing and load balancing. Consequently, the network's ability to meet service level agreements (SLAs) is increased, impacting the reliability and quality of service delivered to end users.

Moreover, these extensions provide comprehensive HBH data, facilitating detection of fewer than all expected network paths being utilized or security breaches where packets are being redirected to unauthorized locations, potentially exposing sensitive data to malicious entities. In essence, these extensions to STAMP provide necessary tools for comprehensive, real-time network diagnostics and performance management, thereby increasing the accuracy and speed of network operations and maintenance.

The mechanisms and extensions described for STAMP protocol may also be applied to different protocol test packets including bidirectional forwarding detection (BFD), ping/traceroute, Internet Control Message Protocol (ICMP), MPLS-PM (RFC6374), and Two-way Active Measurement Protocol (TWAMP). These protocols are defined in their associated industry standards and are augmented with similar Reflected Data TLV extensions and procedures described in this invention using IPv6 extension headers and MNA Sub-Stacks using In-stack and Post-stack Data in their packet headers.

While there have been shown and described illustrative implementations that provide extensions to simple two-way active measurement protocol packets, it is to be understood that various other adaptations and modifications may be made within the spirit and scope of the implementations herein. For example, while certain implementations are described herein with respect to using certain elements, modules, components, architectures, etc. for the purposes of extending the simple two-way active measurement protocol packets, the elements, modules, components, architectures, etc. are not limited as such and may be used for other functions, in other arrangements, in other functional distributions, in other implementations, etc.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented on a tangible (non-transitory) computer-readable medium (e.g., disks/CDs/RAM/EEPROM/etc.) having computer-executable instructions thereon for execution on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:

obtaining, by a device, a Simple Two-way Active Measurement Protocol test packet that includes hop-by-hop data collected by the Simple Two-way Active Measurement Protocol test packet along a path in a network;

determining, by the device, whether the Simple Two-way Active Measurement Protocol test packet includes an instruction to reflect the hop-by-hop data back to an originating session sender;

copying, by the device and based on a determination that the Simple Two-way Active Measurement Protocol test packet includes the instruction, the hop-by-hop data into a type-length-value segment of a reply Simple Two-way Active Measurement Protocol test packet;

transmitting, by the device, the reply Simple Two-way Active Measurement Protocol test packet back to the originating session sender; and returning an error when the type-length-value segment does not match a length of corresponding hop-by-hop data collected by the Simple Two-way Active Measurement Protocol test packet along the path.

2. The method of claim 1, wherein the hop-by-hop data comprises In-Situ Operations, Administration, and Maintenance (IOAM) data collected in an Internet Protocol (IP) header of the Simple Two-way Active Measurement Protocol test packet along the path.

3. The method of claim 1, wherein the hop-by-hop data comprises In-Situ Operations, Administration, and Maintenance (IOAM) data collected in one or more Multiprotocol Label Switching (MPLS) Network Action (MNA) Sub-Stacks in the Simple Two-way Active Measurement Protocol test packet along the path.

4. The method of claim 1, wherein the instruction to reflect the hop-by-hop data back to the originating session sender is included in the Simple Two-way Active Measurement Protocol test packet as a Simple Two-way Active Measurement Protocol type-length-value option.

5. The method of claim 1, further comprising:

including, by the device, an indication in the reply Simple Two-way Active Measurement Protocol test packet that hop-by-hop data should not be collected along the path back to the originating session sender.

6. The method of claim 1, wherein one or more intermediate nodes along the path between the device and the originating session sender add the hop-by-hop data to the Simple Two-way Active Measurement Protocol test packet.

7. The method of claim 1, wherein the Simple Two-way Active Measurement Protocol test packet includes a pre-allocated empty type-length-value segment corresponding to a payload size of hop-by-hop data collected by the Simple Two-way Active Measurement Protocol test packet along the path.

8. The method of claim 1, further comprising:

including, by the device, an indication in the reply Simple Two-way Active Measurement Protocol test packet that one or more intermediate nodes along the path should collect and insert return hop-by-hop data into the reply Simple Two-way Active Measurement Protocol test packet.

9. The method of claim 1, wherein the device is a session reflector in the network.

10. An apparatus, comprising:

one or more network interfaces to communicate with a network;

a processor coupled to the one or more network interfaces and configured to execute one or more processes; and a memory configured to store a process that is executable by the processor, the process, when executed, configured to:

obtain a Simple Two-way Active Measurement Protocol test packet that includes hop-by-hop data collected by the Simple Two-way Active Measurement Protocol test packet along a path in a network;

determine whether the Simple Two-way Active Measurement Protocol test packet includes an instruction to reflect the hop-by-hop data back to an originating session sender;

copy, based on a determination that the Simple Two-way Active Measurement Protocol test packet includes the instruction, the hop-by-hop data into a type-length-value segment of a reply Simple Two-way Active Measurement Protocol test packet;

transmit the reply Simple Two-way Active Measurement Protocol test packet back to the originating session sender, and return an error when the type-length-value segment does not match a length of corresponding hop-by-hop data collected by the Simple Two-way Active Measurement Protocol test packet along the path.

11. The apparatus as in claim 10, wherein the hop-by-hop data comprises data is In-Situ Operations, Administration, and Maintenance (IOAM) data collected in an Internet Protocol (IP) header of the Simple Two-way Active Measurement Protocol test packet along the path.

12. The apparatus as in claim 10, wherein the hop-by-hop data comprises In-Situ Operations, Administration, and Maintenance (IOAM) data collected in one or more Multiprotocol Label Switching (MPLS) Network Action (MNA) Sub-Stacks in the Simple Two-way Active Measurement Protocol test packet along the path.

13. The apparatus as in claim 10, wherein the instruction to reflect the hop-by-hop data back to the originating session sender is included in the Simple Two-way Active Measurement Protocol test packet as a Simple Two-way Active Measurement Protocol type-length-value option.

14. The apparatus as in claim 10, wherein the process when executed is further configured to:

include an indication in the reply Simple Two-way Active Measurement Protocol test packet that hop-by-hop data should not be collected along the path back to the originating session sender.

15. The apparatus as in claim 10, wherein one or more intermediate nodes along the path between the apparatus and the originating session sender add the hop-by-hop data to the Simple Two-way Active Measurement Protocol test packet.

16. The apparatus as in claim 10, wherein the Simple Two-way Active Measurement Protocol test packet includes pre-allocated empty type-length-value segment corresponding to a payload size of hop-by-hop data collected by the Simple Two-way Active Measurement Protocol test packet along the path.

17. The apparatus as in claim 10, wherein the process when executed is further configured to:

an indication in the reply Simple Two-way Active Measurement Protocol test packet that one or more intermediate nodes along the path should collect and insert return hop-by-hop data into the reply Simple Two-way Active Measurement Protocol test packet.

18. A tangible, non-transitory, computer-readable medium having computer-executable instructions stored thereon that, when executed by a processor on a computer, cause the computer to perform a method comprising:

obtaining a Simple Two-way Active Measurement Protocol test packet that includes hop-by-hop data collected by the Simple Two-way Active Measurement Protocol test packet along a path in a network;

determining whether the Simple Two-way Active Measurement Protocol test packet includes an instruction to reflect the hop-by-hop data back to an originating session sender;

copying, based on a determination that the Simple Two-way Active Measurement Protocol test packet includes the instruction, the hop-by-hop data into a type-length-value segment of a reply Simple Two-way Active Measurement Protocol test packet;

transmitting the reply Simple Two-way Active Measurement Protocol test packet back to the originating session sender; and returning an error when the type-length-value segment does not match a length of corresponding hop-by-hop data collected by the Simple Two-way Active Measurement Protocol test packet along the path.

19. The tangible, non-transitory, computer-readable of claim 18, wherein the method further comprises:

including a Simple Two-way Active Measurement Protocol type-length-value in the reply Simple Two-way Active Measurement Protocol test packet indicating (i) that hop-by-hop data should not be collected along the path back to the originating session sender or (ii) that one or more intermediate nodes along the path should collect and insert return hop-by-hop data into the reply Simple Two-way Active Measurement Protocol test packet.

20. The tangible, non-transitory, computer-readable of claim 18, wherein the hop-by-hop data comprises In-Situ Operations, Administration, and Maintenance (IOAM) data collected in one or more Multiprotocol Label Switching (MPLS) Network Action (MNA) Sub-Stacks in the Simple Two-way Active Measurement Protocol test packet along the path.

* * * * *